(12) United States Patent
Norton

(10) Patent No.: US 10,404,671 B2
(45) Date of Patent: *Sep. 3, 2019

(54) APPROACH FOR MESSAGE LEVEL ENCRYPTION FOR SERVICE APIS

(71) Applicant: Blackhawk Network, Inc., Pleasanton, CA (US)

(72) Inventor: Derk Norton, Pleasanton, CA (US)

(73) Assignee: BLACKHAWK NETWORK, INC., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,579

(22) Filed: Oct. 16, 2018

(65) Prior Publication Data
US 2019/0052612 A1 Feb. 14, 2019

Related U.S. Application Data

(63) Continuation of application No. 15/355,872, filed on Nov. 18, 2016, now Pat. No. 10,129,225, which is a continuation of application No. 14/596,267, filed on Jan. 14, 2015, now Pat. No. 9,531,688.

(60) Provisional application No. 61/927,734, filed on Jan. 15, 2014.

(51) Int. Cl.
H04L 9/08 (2006.01)
H04L 29/06 (2006.01)
H04L 9/32 (2006.01)
A47L 15/23 (2006.01)
A47L 15/42 (2006.01)

(52) U.S. Cl.
CPC .......... *H04L 63/0471* (2013.01); *A47L 15/23* (2013.01); *H04L 9/0825* (2013.01); *H04L 9/0861* (2013.01); *H04L 9/3247* (2013.01); *H04L 63/0442* (2013.01); *A47L 15/4282* (2013.01); *H04L 2463/062* (2013.01)

(58) Field of Classification Search
CPC .................................................. H04L 63/0471
See application file for complete search history.

(56) References Cited

U.S. PATENT DOCUMENTS

| | | | | |
|---|---|---|---|---|
| 6,904,150 B1* | 6/2005 | Dent | ....... | H04L 9/304 380/28 |
| 7,949,355 B2* | 5/2011 | Brown | ....... | H04L 51/38 345/472 |
| 8,327,157 B2* | 12/2012 | West | ....... | H04L 51/08 713/189 |
| 2005/0244007 A1* | 11/2005 | Little | ....... | H04L 51/066 380/270 |

* cited by examiner

*Primary Examiner* — Kambiz Zand
*Assistant Examiner* — Thanh H Le
(74) *Attorney, Agent, or Firm* — Wick Phillips Gould & Martin LLP; Jerry C. Harris, Jr.

(57) ABSTRACT

Disclosed are requesting party and responding party computer systems which perform a message level encryption for messages sent through the computer systems. Using the message level encryption, the computer systems may prevent those with access to an unsecured zone in one or more of the computer systems from viewing the messages.

22 Claims, 5 Drawing Sheets

APPROACH FOR MESSAGE LEVEL ENCRYPTION FOR SERVICE APIS

CROSS-REFERENCE TO RELATED APPLICATIONS

This application is a continuation application of and claims priority to U.S. patent application Ser. No. 15/355,872 filed on Nov. 18, 2016, which is a continuation application of and claims priority to U.S. patent application Ser. No. 14/596,267 filed on Jan. 14, 2015, now U.S. Pat. No. 9,531,688, which claims priority to U.S. Provisional Application No. 61/927,734, filed on Jan. 15, 2014, entitled "Design Approach for Message Level Encryption for Service APIs," which is hereby incorporated by reference for all purposes.

FIELD

The present invention generally relates to the exchange of information using encryption.

BACKGROUND

Many of the older financial institutions follow an "onion security model" which has many layers of security between the application servers and the network edge. The "onion security model" requires that, at each layer of security, a message be decrypted, analyzed, and re-encrypted before passing a message on to the next layer. Most financial institutions have not yet moved to secure, lights out data centers. Instead, operations personnel at financial institutions are allowed both physical and login access to a financial institution's servers. Therefore, the operations personnel can see unencrypted messages while the messages are analyzed at each layer of security.

SUMMARY

Disclosed herein is a method for message level encryption executed by one or more dedicated processors of a computer system of a requesting party for encrypted transmission of messages through an unsecure zone within the computer system of the requesting party, through an unsecure zone within a computer system of a responding party, or through both. The method may comprise encrypting, by the one or more dedicated processors, a request message with a request message-level encryption; encrypting, by the one or more dedicated processors, the request message with a request second level encryption; sending, by the one or more dedicated processors, the request message to a responding party via the unsecure zone within the computer system of the requesting party, via the unsecure zone within the computer system of the responding party, or via both; generating, by the one or more dedicated processors, a request session key uniquely created for the request message; encrypting, by the one or more dedicated processors, the request session key to produce an encrypted request session key; receiving, by the one or more dedicated processors, a response message having a response message level encryption and a response second level encryption from the responding party via passage of the response message through the unsecure zone within the computer system of the requesting party, via passage of the response message through the unsecure zone within the computer system of the responding party, or via both; decrypting, by the one or more dedicated processors, the response second level encryption; decrypting, by the one or more dedicated processors, the response message level encryption using a requester private key, a response session key, or both; decrypting, by the one or more dedicated processors, the response message level encryption using the request session key; storing, by the one or more dedicated processors, a requester public key, the requester private key, and a responder public key in an HSM system of the requesting party; or combinations thereof.

Also disclosed herein is a method for message level encryption executed by or more dedicated processors of a computer system of a responding party for encrypted transmission of messages through an unsecure zone within the computer system of the requesting party, through an unsecure zone within a computer system of a responding party, or through both, the method comprising encrypting, by the one or more dedicated processors, a response message with a response message-level encryption; encrypting, by the one or more dedicated processors, the response message with a response second level encryption; sending, by the one or more dedicated processors, the response message to the requesting party via the unsecure zone within the computer system of the requesting party, via the unsecure zone within the computer system of the responding party, or via both; receiving, by the one or more dedicated processors, a request session key from the requesting party; generating, by the one or more dedicated processors, a response session key uniquely created for the response message; encrypting, by the one or more dedicated processors, the response session key to produce an encrypted response session key; receiving, by the one or more dedicated processors, a request message having a request message level encryption and a request second level encryption from the requesting party via passage of the request message through the unsecure zone within the computer system of the requesting party, via passage of the response message through the unsecure zone within the computer system of the responding party, or via both; decrypting, by the one or more dedicated processors, the request second level encryption; decrypting, by the one or more dedicated processors, the request message level encryption using a responder private key, the request session key, or both; storing, by the one or more dedicated processors, a responder public key, the responder private key, and a requester public key in an HSM system of the responding party; or combinations thereof.

Also disclosed herein is a request server comprising one or more dedicated processors which perform message level encryption in a computer system of a requesting party, for encrypted transmission of messages through an unsecure zone within the computer system of the requesting party, through an unsecure zone within a computer system of a responding party, or through both. The one or more dedicated processors may cause the request server to encrypt a request message with a request message-level encryption; encrypt the request message with a request second level encryption; send the request message to a responding party via the unsecure zone within the computer system of the requesting party, via the unsecure zone within the computer system of the responding party, or via both; generate a request session key uniquely created for the request message; encrypting the request session key to produce an encrypted request session key; receive a response message having a response message level encryption and a response second level encryption from the responding party via passage of the response message through the unsecure zone within the computer system of the requesting party, via passage of the response message through the unsecure zone within the computer system of the responding party, or via both; decrypt the response second level encryption; decrypt the response message level encryption using a requester private key, a response session key, or both; decrypting, by the one or more dedicated processors, the response message level encryption using the request session key; store a requester public key, the requester private key, and a responder public key in an HSM system of the requesting party; or combinations thereof.

Also disclosed herein is a response server comprising one or more dedicated processors which perform message level encryption in a computer system of a responding party, for encrypted transmission of messages through an unsecure zone within the computer system of the responding party, through an unsecure zone within a computer system of a requesting party, or through both. The one or more dedicated processors may cause the request server to encrypt a response message with a response message-level encryption; encrypt the response message with a response second level encryption; send the response message to the requesting party via the unsecure zone within the computer system of the requesting party, via the unsecure zone within the computer system of the responding party, or via both; receive a request session key from the requesting party; generate a response session key uniquely created for the response message; encrypt the response session key to produce an encrypted response session key; receive a request message having a request message level encryption and a request second level encryption from the requesting party via passage of the request message through the unsecure zone within the computer system of the requesting party, via passage of the response message through the unsecure zone within the computer system of the responding party, or via both; decrypt the request second level encryption; decrypt the request message level encryption using a responder private key, the request session key, or both; store a responder public key, the responder private key, and a requester public key in an HSM system of the responding party; or combinations thereof.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION

Figure 1:
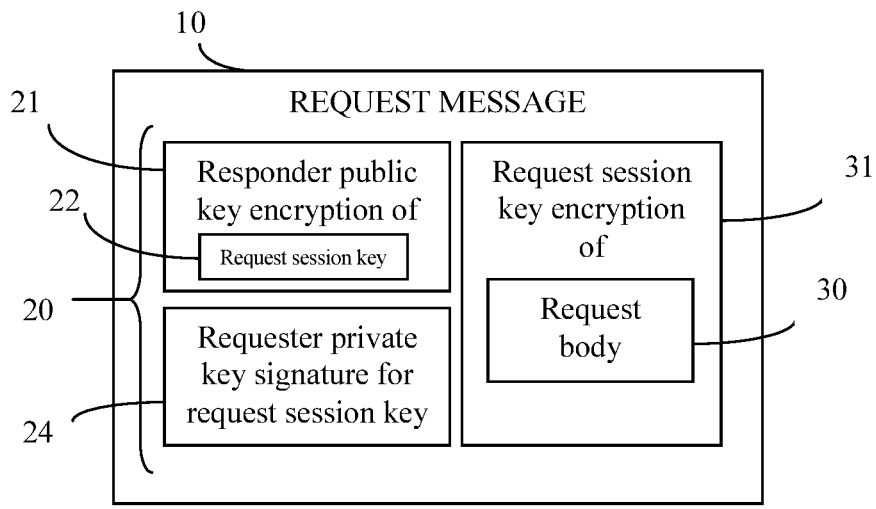
FIG. 1 illustrates an embodiment of a request message.

Disclosed herein are methods, servers, and computer systems for providing secure transmission of request and response messages between a requesting party and a responding party, where the messages are encrypted at the message level for passage through areas or points in a computer system of the requesting party and/or the responding party which are not secure, for example, over unsecure network connections or within an unsecure server itself.

The request computer system generally comprises computer devices including at least one server, at least one security proxy, a hardware security module, and communications networking connecting the server, security proxy, and hardware security module such that information may flow among the computer devices in the request computer system. Likewise, the response computer system generally comprises computer devices including at least one server, a security gateway, optionally a security proxy, at least one database, a hardware security module, and communications hardware connecting the server, security gateway, optional security proxy, and hardware security module such that information may flow among the computer devices in the response computer system. According to embodiments of the disclosure, at least one of the request computer system and response computer system has at least one unsecure zone, e.g., an internal part of the computer system where information is viewable by those with access to the computer system. For example, a financial institution (e.g., a bank) may have personnel with access (e.g., login credentials) to a server and/or communication networking in the financial institution's computer system. Without encryption of the information passing internally of the financial institution's computer system according to this disclosure, personnel with access to the financial institution's computer system can view the information.

The term "encrypt" means to transform from an intelligible form to an unintelligible form.

The term "encryption" means a process of transforming from intelligible form to an unintelligible form.

The term "decrypt" means to transform from an unintelligible form to an intelligible form.

The term "decryption" means a process of transforming from an unintelligible form to an intelligible form.

The term "requesting party" includes any individual or entity having a relationship with a responding party for sending a request to the responding party.

The term "responding party" includes any individual or entity that has a relationship with the requesting party and that responds to the request received from the requesting party.

The term "server" includes one or more physical computer devices which include one or more processors and instructions which cause the server to perform the functions specified herein. It is intended that "server" may refer to a single server performing the functions disclosed herein or multiple servers collectively performing the functions disclosed herein.

The term "processor" refers to a physical component of a server which can be coupled with a physical non-transitory computer readable memory of the server which stores programming instructions. It is intended that "processor" may refer to a single processor which executes the instructions or multiple processors which collectively execute the instructions.

The term "dedicated processor" refers to a physical component of a server which can be coupled with a physical non-transitory computer readable memory of the server which stores programming instructions, wherein the dedicated processor performs specific and/or particular functions pursuant to specific programming instructions. It is intended that dedicated processor may refer to a single processor which executes the specific programming instructions or multiple processors which collectively execute the specific programming instructions. In an embodiment, the dedicated processor only performs the specific programming instructions' specific and/or particular functions. In another embodiment, the dedicated processor performs the specific programming instructions' specific and/or particular functions as well as other functions.

The term "communication networking" includes wired and wireless connectivity for the transmission of information such as the keys and messages disclosed herein. Non-limiting examples of communication networking include Ethernet, optical cables, coaxial cables, telephone lines, Wi-Fi communication hardware, Bluetooth communication hardware, satellite transmitter, mobile phone and data networks, and the like.

The term "unsecure zone" as used herein refers to a part of a computer system which those with access thereto can view, determine of otherwise obtain the information (e.g., credit card information, bank account information, personal information, etc.) contained in messages transmitted, processed, and/or analyzed in that part of the computer system, absent message level encryption.

In embodiments, the computer system of each of the requesting party and responding party may generate a public key and a private key pair for use in the disclosed methods and systems. The request computer system may generate a requester public key and a requester private key, and similarly, the response computer system may generate a responder public key and a responder private key. In alternative embodiments, the public and private key of the requesting party may be generated outside the computer system of the requesting party disclosed herein. In alternative embodiments, the public and private key of the responding party may be generated outside the computer system of the responding party disclosed herein.

The requesting party may store the requester public key and requester private key in a hardware security module of the requesting party (hereinafter "request HSM") for subsequent use as disclosed herein. Likewise, the responding party may store the responder public key and responder private key in a hardware security module of the responding party (hereinafter "response HSM") for subsequent use as disclosed herein.

A relationship may be created between a requesting party and a responding party when the requesting party provides the requester public key to the responding party, and the responding party provides the responder public key to the requesting party. Additionally or alternatively, a relationship may be created between a requesting party and a responding party when the requesting party receives the responder public key from the responding party, and the responding party receives the requester public key from the requesting party.

The requesting party may store the responder public key in the request HSM for subsequent use as disclosed herein. Likewise, the responding party may store the requester public key in the response HSM for subsequent use as disclosed herein. Once the relationship between a requesting party and a responding party is established, message level encrypted request messages may be sent from request computer system of the requesting party to the response computer system of the responding party, and message level encrypted response messages may be sent from response computer system of the responding party to the request computer system of the requesting party.

The request computer system may generate a requester private key and store the requester private key on the request HSM for retrieval when a request message is to be sent to the responding party. The response computer system may generate a responder private key and store the responder private key on the response HSM for retrieval when a response message is to be sent to the requesting party.

In order to send a request message to a responding party, the request computer system may generate a request session key which is a one-time-use session key unique to the request message. In order to send a response message, the response computer system may, in some embodiments, generate a response session key which is a one-time-use session key unique to the response message, or in other embodiments, use the received request session key for the response message. In embodiments, the request session key is not stored on either of the response HSM or the request HSM. In embodiments which utilize a response session key, the response session key is not stored on either of the response HSM or the request HSM.

A brief explanation regarding the public keys, private keys, and session keys used in the message level encryption disclosed herein are shown in Table 1 below. The keys are also discussed in more detail herein.

TABLE 1

| | |
|---|---|
| Requester Public Key | shared with a responding party before transmission of a request message, e.g., via email or secure file transfer |
| | used by a responding party to encrypt a response session key |
| | used by a responding party to verify a signature of an encrypted request session key |
| Requester Private Key | used by a requesting party to decrypt an encrypted response session key |
| | used by a requesting party to generate a signature for an encrypted request session key |
| Request Session Key | used by a requesting party to encrypt a body of a request message |
| | passed to a responding party as an encrypted header value of a request message |
| | used by a responding party to decrypt an encrypted body of a request message |
| Responder Public Key | shared with a requesting party before transmission of a request message, e.g., via email or secure file transfer |
| | used by a requesting party to encrypt a request session key |
| | used by a requesting party to verify a signature of an encrypted response session key |
| Responder Private Key | used by a responding party to decrypt an encrypted request session key |
| | used by a responding party to generate a signature for an encrypted response session key |

TABLE 1-continued

| | |
|---|---|
| Response Session Key | used by a responding party to encrypt a body of a response message |
| | passed to a requesting party as an encrypted header value of a response message |
| | used by a requesting party to decrypt an encrypted body of a response message |

FIG. 1 illustrates an embodiment of a request message 10. As can be seen, a request message 10 may comprise a request header 20 and an encrypted request body 31. The request header 20 may comprise a request session key 22 and a request signature 24. The request session key 22 may be encrypted using the responder public key to produce the encrypted request session key 21. The requester private key is used to generate the signature 24 for the encrypted request session key 21, the requester private key may be used to generate signature 24 for the request session key 22, or both. The request body 30 may be encrypted using the request session key 22 to produce an encrypted request body 31. The request message 10 configured as described for FIG. 1 may be sent from the requesting party's request computer system to the responding party's response computer system (described in more detail below).

Figure 2:
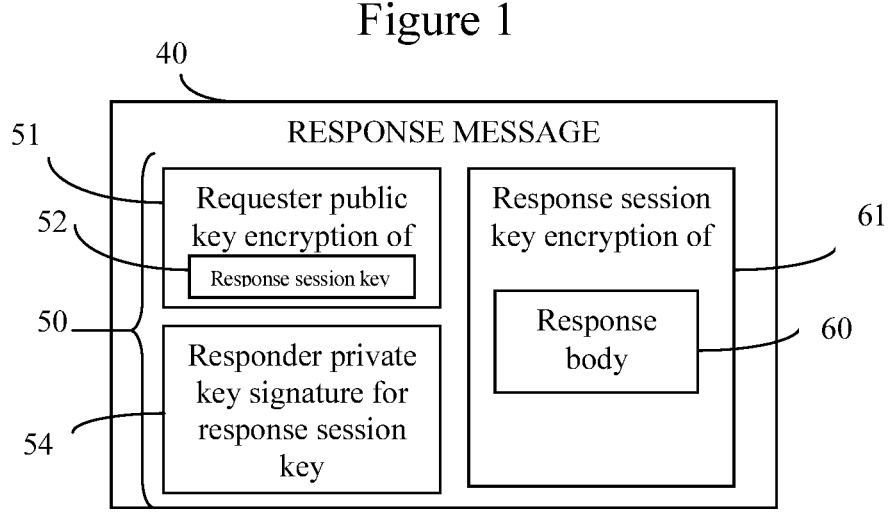
FIG. 2 illustrates an embodiment of a response message.

FIG. 2 illustrates an embodiment of a response message 40. As can be seen, the response message 40 may comprise a response header 50 and an encrypted response body 61. The response header 50 may comprise a response session key 52 and a response signature 54. The response session key 52 may be encrypted using the requester public key to produce the encrypted response session key 51. The responder private key may be used to generate signature 54 for the encrypted response session key 51, the responder private key may be used to generate signature 54 for the response session key 52, or both. The response body 60 may be encrypted using the response session key 52 to produce an encrypted response body 61. The embodiment of the response message 40 configured as described for FIG. 2 may be sent from the responding party's response computer system to the requesting party's request computer system (described in more detail below).

Figure 3:
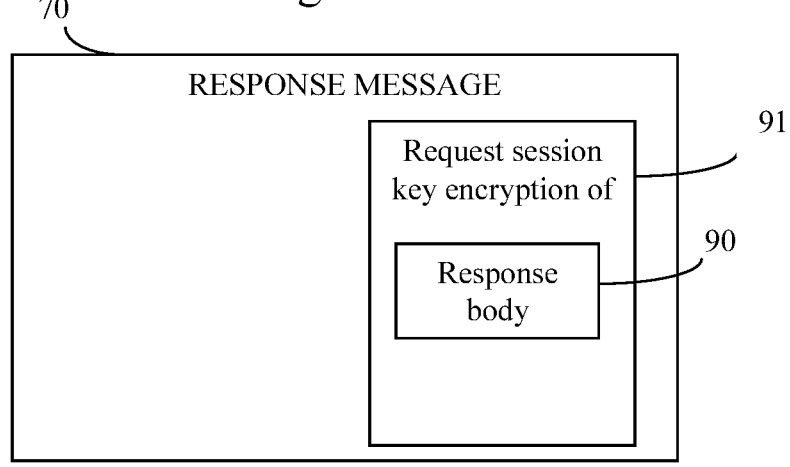
FIG. 3 illustrates another embodiment of a response message.

FIG. 3 illustrates an alternative embodiment of a response message 70. As can be seen, the response message 70 may comprise an encrypted response body 91. The response body 90 may be encrypted using the request session key 22 obtained from the request message 10 to produce encrypted response body 91. The embodiment of the response message 70 configured as described for FIG. 3 may be sent from the responding party's response computer system to the requesting party's request computer system (described in more detail below).

Nonlimiting HTTP header attribute examples the headers 20 and 50 depicted in FIGS. 1 and 2 are shown in Table 2 below:

TABLE 2

Example HTTP Header Attributes

| Type | Description | Scope |
|---|---|---|
| Accept | matches the body format of response message required by the requesting party | Request Message Only |
| Accept-Encoding | matches the encoding of the body of the response message required by the requesting party | Request Message Only |

TABLE 2-continued

Example HTTP Header Attributes

| Type | Description | Scope |
|---|---|---|
| Content-Type | matches the body format of the request message | Request and Response Messages |
| Content-Encoding | matches the encoding of the body of request message | Request and Response Messages |
| Encrypted-Key | the encrypted session key | Request and Response Messages |
| Key-Signature | the signature of the encrypted session key | Request and Response Messages |

The body format of the request message and response message can be any format known in the art with the aid of this disclosure, for example, "JSON" or "XML" format. The encryption and decryption of the body of the request message and response message can be made using any symmetric encryption algorithm known in the art with the aid of this disclosure, for example, the "AES/CBC/PKCS7Padding" algorithm. The encryption and decryption of the session key and the generation and validation of the signature of the encrypted session key can be made using any asymmetric encryption algorithm known in the art with the aid of this disclosure, for example, "SHA1withRSA" for the signature, and "RSA/NONE/OAEPWithSHA256AndMGF1Padding" for encryption. The encoding format for the encrypted session key and signature can be any format known in the art with the aid of this disclosure, for example, "org.apache.commons.codec.binary.Base64" for byte encoding. In embodiments, the same algorithm is used to encode and decode a parameter, e.g., the requesting party and responding party use the same algorithm to encode and decode the request body of the request message. In embodiments, the format of the request message and the format of the response message can be the same. Alternatively, the format of the request message and the format of the response message can be different.

In embodiments, the algorithm(s) which are used to encode the request message can be the same as the algorithm(s) which are used to decode the request message; the algorithm(s) which are used to encode the request message can be not the same as (different from) the algorithm(s) which are used to decode the request message; the algorithm(s) which are used to encode the response message can be the same as the algorithm(s) which are used to decode the response message; the algorithm(s) which are used to encode the response message can be not the same as (different from) the algorithm(s) which are used to decode the response message; the algorithm(s) which are used to encode the request message can be the same as the algorithm(s) which are used to encode the response message; the algorithm(s) which are used to encode the request message can be not the same as (different from) the algorithm(s) which are used to encode the response message; the algorithm(s) which are used to encode the request message can be the same as the algorithm(s) which are used to decode the response message; the algorithm(s) which are used to encode the request message can be not the same as (different from) the algorithm(s) which are used to decode the response message; the algorithm(s) which are used to decode the request message can be the same as the algorithm(s) which are used to encode the response message; the algorithm(s) which are used to decode the request message can be not the same as (different from) the algorithm(s) which are used to encode the response message; the algorithm(s) which are used to decode the request message can be the same as the algorithm(s) which are used to decode the response message; the algorithm(s) which are used to decode the request message can be not the same as (different from) the algorithm(s) which are used to decode the response message; or combinations thereof.

Figure 4:
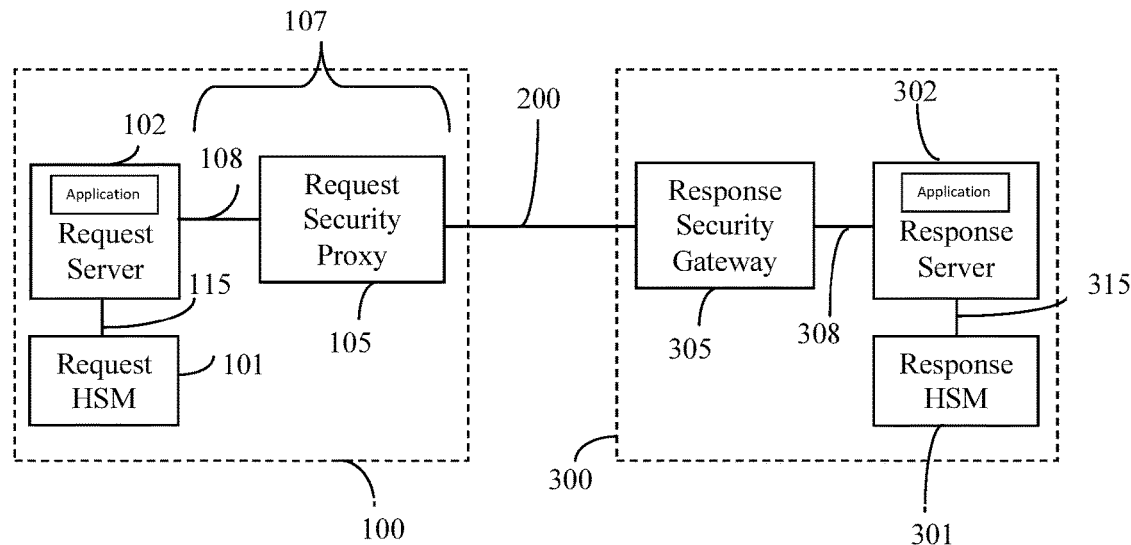
FIG. 4 schematically illustrates a request computer system which communicates with a response computer system via an unsecure zone internal to the request computer system, utilizing the message level encryption disclosed herein.

FIG. 4 schematically illustrates a request computer system 100 which communicates with a response computer system 300 via an unsecure zone 107 internal to the request computer system 100, utilizing message level encryption. The message level encryption is generally executed on the request server 102 of the request computer system 100 and the response sever 302 of the response computer system 300 so as to transmit a message-level encrypted request message (e.g., request message 10) and receive a message-level encrypted response message (e.g., response message 40 or 70) via an unsecure zone 107 within the request computer system 100.

In embodiments, the request server 102 may receive the responder public key and generating a requester public key and a requester private key (e.g., receipt of a responder public key and generation of a requester public/private key pair may be accomplished via a technique known in the art). In embodiments, the request server 102 may receive instruction or decide (e.g., upon the occurrence of one or more conditions) to generate a request. The request server 102, having previously stored the responder public key and requester private key on the request HSM 101, may retrieve the stored keys from request HSM 101 via communication networking 115 between the request server 102 and the request HSM 101. The request server 102 may generate a request session key 22 and create the request message 10 having the message level encryption described in FIG. 1, where the request session key 22 is uniquely created for the request message 10. Moreover, the request session key 22 is a one-time use session key in that the request session key 22 is not used for another request message (although the request session key 22 may be used for a response message 70 as described in more detail herein).

The request server 102 may send the request message 10 to the response server 302 via an unsecure zone 107 within the request computer system 100. In FIG. 4, the unsecure zone 107 may be the communication networking 108, the request security proxy 105, or both. Those with access to the communication networking 108, the request security proxy 105, or both, cannot view or determine the contents of the request message 10 because the request server 102, before transmitting the request message 10 via communication networking 108 and request security proxy 105, may encrypt the body 30 of the request message 10 with the message level encryption described in FIG. 1, e.g., the request session key 22 is encrypted using the responder public key to produce encrypted request session key 21, the requester private key is used to generate the signature 24 for the encrypted request session key 21, and the request body 30 is encrypted using the request session key 22 to produce encrypted request body 31. The request message 10 is transmitted via communication networking 108 to the request security proxy 105 where the request message 105 is analyzed (e.g., message auditing). In the request security proxy 105, the request message 10 remains with the message level encryption as described in FIG. 1 such that those with access to the request security proxy 105 cannot view or determine the information contained in the request message 10. That is, the request security proxy 105 of the request computer system 100 does not have both the responder private key and request session key which are needed to decrypt the message level encryption applied to the request message 10 (e.g., the responder private key which is needed to decrypt the encrypted request session key 21 or the request session key 22 needed to decrypt the encrypted request body 31 of the request message 10). The "message level encryption" disclosed herein is also referred to as "first level encryption."

The request security proxy 105 may refer to an application run on a server (e.g., the request server 102 or another server in the request computer system 100), or the request security proxy 105 may itself be one or more servers of the request computer system 100 in addition to the request server 102. The request security proxy 105 may use a client certificate issued by the responding party to authenticate the request computer system 100 to the response computer system 300 and to establish a second level encryption in addition to the first level encryption (e.g., message level encryption as described herein) of the request message 10, e.g., the second level encryption being TLS encryption within HTTPS, for transmission of the request message 10 to the response computer system 300.

The second level encryption may be different than the first level encryption (e.g., message level encryption described herein) at least because the first level encryption uses the public keys, private keys, and session keys for the message level encryption described herein, while the second level encryption uses the client and server certificates for bi-directional authentication and establishing a transmission level encryption (e.g., TLS encryption within HTTPS) for transmitting the request message 10 to the response computer system 300. The terms "transmission level encryption" and "second level encryption" are interchangeable. After establishing the second level encryption for transmission of the request message 10, the request computer system 100 sends the request message 10 to the response computer system 300 via communication pathway 200 (e.g., HTTPS). In embodiments, the communication pathway 200 is a two-way communication pathway.

After sending the request message 10, the request server 102 may destroy any copy of the request session key 22 on the request server 102; alternatively, the request server 102 may retain the request session key 22 within the request computer system 100 to decrypt a response message (e.g., response message 70).

The response computer system 300 may receive the request message 10 having the first level encryption (message level encryption) and second level encryption (transmission level encryption) via the communication pathway 200. In the embodiment shown in FIG. 4, the response computer system 300 has no unsecure zone (e.g., is a cloud based system), unlike the request computer system 100.

In embodiments, the response computer system 300 may have a security gateway 305 which establishes the second level encryption with the request computer system 100 using a server certificate of the responding party to authenticate the response computer system 300 to the request computer system 100 for establishing the second level encryption for transmission of the request message 10. In an embodiment, the security gateway 305 is an application contained on the response server 302; alternatively, the security gateway 305 is another server in the response computer system 300 connected to the response server 302 via communication networking 308. After decrypting the second level encryption, the security gateway 305 establishes an internal second level encryption for transmission of the request message 10 still having the first level encryption (e.g., the message level encryption) internally of the response computer system 300 from the security gateway 305 to the response server 302.

The internal second level encryption may be established using an internal client certificate and/or internal server certificate of the responding party to provide the internal second level encryption in addition to the first level encryption (e.g., message level encryption as described herein) of the request message 10, e.g., TLS encryption within HTTPS. The security gateway 305 may send the request message 10 having first level encryption and internal second level encryption to the response server 302 via communication networking 308 (e.g., via TLS encryption within HTTPS).

The internal second level encryption may be different than the first level encryption (e.g., message level encryption described herein) at least because the first level encryption uses the public keys, private keys, and session keys for the first level encryption described herein, while the internal second level encryption uses an internal client certificate and/or certified server certificate for authentication and establishing an internal transmission level encryption (e.g., TLS encryption within HTTPS) for transmitting the request message 10 to the response server 302 via communication networking 308 within the response computer system 300. Additionally, the internal second level encryption is different than the second level encryption used for transmitting the request message 10 via communication pathway 200 at least because the internal second level encryption is for communication between components only of the responding party's response computer system 300; whereas, the second level encryption (transmission level encryption) is for secure communication between the requesting party's request computer system 100 and the responding party's response computer system 300.

The response server 302 may receive the request message 10 having first level encryption and second level encryption (e.g., the internal second level encryption for embodiments of the response computer system 300 having a security gateway 305, or the second level encryption for embodiments in which the request computer system 100 sends the request message 10 to the response server 302 without first passing through the security gateway 305). The response server 302 may decrypt the second level encryption (e.g., the internal second level encryption or the transmission level encryption, depending on the configuration of the response computer system 300).

The response server 302 may then analyze the first level encryption of the request message 10. The response server 302 may determine the request message 10 is a request message which contains a signature 24 (e.g., which was generated using the requester private key). The response server 302 may determine that the signature 24 can be verified using the requester public key by the responding party (e.g., the requester public key having been: i) previously received by the response server 302, ii) stored on the response HSM 301, or iii) both received and stored). The response server 302 may search for and/or retrieve the requester public key and the responder private key from the response HSM 301 via communication networking 315.

In embodiments, the response server 302 may use the signature 24 of the request message 10 to verify the encrypted request session key 21 has not been altered during transmission. In other embodiments, to verify the encrypted request session key 21, the response server 302 may use the requester public key in addition to the signature 24. In embodiments, using the requester public key also verifies that the requesting party is the party who encrypted the request session key 22. In additional or alternative embodiments, using the requester public key also verifies that the request message 10 is actually from the request server 102.

After verification of the encrypted request session key 21, the response server 302 may decrypt the encrypted request session key 21 of the request message 10 using the responder private key which matches and/or pairs with the responder public key which was used to encrypt the request session key 22. After decryption of the encrypted request session key 21, the response server 302 may decrypt the encrypted request body 31 of the request message 10 using the request session key 22.

The response server 302 may then interpret the body 30 of the request message 10 and generate a response. Alternatively, the response server 302 may communicate with another server of the response computer system 300, e.g., communicate the request to another server which generates a response and which sends the response back to the response server 302 for message level encryption.

The response server 302 performs message level encryption of the response so as to generate a response message (e.g., response message 40 of FIG. 2 or response message 70 of FIG. 3) having first level encryption (message level encryption) for transmission of the response message 40 or 70 to the request computer system 100 and for passage of the response message 40 or 70 through the unsecure zone 107 of the request computer system 100.

In an embodiment, the response server 302 may generate a response session key 52 and create the response message 40 as with the message level encryption described for FIG. 2, where the response session key 52 is uniquely created for the response message 40. Moreover, the response session key 52 is a one-time use session key in that the response session key 52 is not used for another response message. The response server 302, having previously stored the requester public key and responder private key on the response HSM 301, may retrieve the stored keys from response HSM 301 via communication networking 315 between the response server 302 and the request HSM 301. For response message 40, the response session key 52 may be encrypted using the requester public key to produce the encrypted response session key 51, the responder private key may be used to generate the signature 54 for the encrypted response session key 51 (or for the response session key 52), and the response body 60 may be encrypted using the response session key 52 to produce encrypted response body 61. The response server 302 may send the response message 40 to the request server 102 via communication networking 308, response security gateway 305, communication pathway 200, or combinations thereof, and via the request security proxy 105 and the unsecure zone 107 described above which resides within the request computer system 100.

In another embodiment, the response server 302 may use the request session key 22 received from the request server 102 for message level encryption of the response message 70 described for FIG. 3. The response server 302 may encrypt the response body 90 using the request session key 22 obtained from the request message 10 to produce encrypted response body 91. Because the request server 102 already has the request session key 22, the request session key 22 may not be included in the response message 70. As such, response message 70 may have a different embodiment of first level encryption than the first level encryption described for response message 40 and request message 10. The response server 302 may send the response message 70 to the request server 102 via an unsecure zone 107 described above which resides within the request computer system 100. The response server 302 may send the response message 70 to the request server 102 via communication networking 308, response security gateway 305, communication pathway 200, or combinations thereof, and via the request security proxy 105 and the unsecure zone 107 described above which resides within the request computer system 100.

To send the response message 40 or 70, the response server 302 or response security gateway 305 may authenticate the response computer system 300 using the server certificate and may establish the second level encryption for transmission of the response message 40 or 70 from the response computer system 300 to the request computer system 100. The second level encryption for transmission of the response message 40 or 70 from the response computer system 300 to the request computer system 100 may be the same as the second level encryption for transmission of the request message 10 from the request computer system 100 to the response computer system 300, e.g., TLS encryption within HTTPS via communication pathway 200.

After sending the response message 40 or 70, the response server 302 may destroy any copy of the response session key 52 and request session key 22 on the response server 302 or otherwise contained within the response computer system 300.

Once the response message 40 or 70 is received, the security proxy 105 decrypts the second level encryption and sends the response message 40 or 70 still having first level encryption (message level encryption) to the request server 102 via communication networking 108. The request security proxy 105 may also perform any message auditing on the response 40 or 70 (e.g., check the message for a blacklisted IP address, a virus signature, a frequency of the response, or other message auditing). While passing through the request security proxy 105 and communication networking 108, the response message 40 or 70 has the first level encryption which prevents those with access to the unsecure zone 107 (e.g., the request security proxy 105, the communication networking 108, or both) from viewing the information contained within the response message 40 or 70.

The request server 102 may then analyze the first level encryption of the response message 40 or 70.

After analysis in embodiments having the response message 40, the request server 102 may determine the response message 40 is a response message which contains signature 54 (e.g., which was generated using the responder private key). The request server 102 may determine that the signature 54 can be verified using the responder public key previously received by the requesting party (e.g., the responder public key having been stored on the request HSM 101).

The request server 102 may search for and/or retrieve the responder public key and the requester private key from the request HSM 101 via communication networking 115. The request server 102 may then validate the signature 54 of the response message 40 using the responder public key via one or more public/private key verification techniques known in the art with the aid of this disclosure. For example, to validate the signature 54, the request server 102 may use the responder public key to verify that the signature 54 of the response message 40 was generated by the responding party using the responder private key.

After signature verification of the response message 40, the request server 102 may decrypt the encrypted response session key 51 of the response message 40 using the requester private key which matches and/or pairs with the requester public key which was used to encrypt the response session key 52. After decryption of the encrypted response session key 51, the request server 102 may decrypt the encrypted response body 61 of the response message 40 using the response session key 52. The request server 102 may then interpret the body 60 of the response message 40.

After analysis in embodiments having the response message 70, because the requesting party already has the request session key 22, the request server 102 may decrypt the encrypted response body 91 of the response message 70 using the request session key 22. Response message 70 has no signature which needs to be verified by the request server 102. The request server 102 may then interpret the body 90 of the response message 70.

Figure 5:
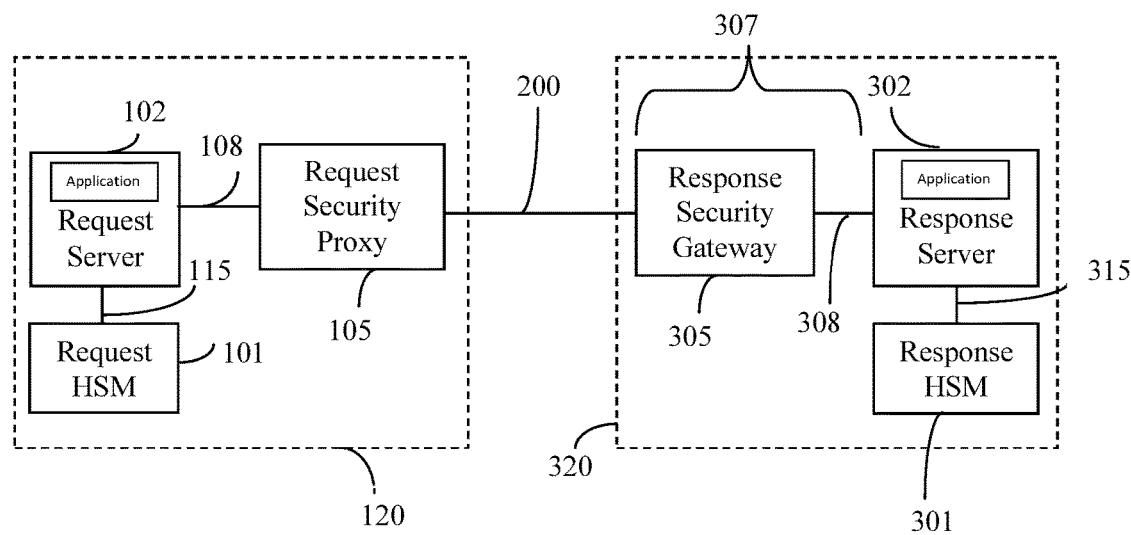
FIG. 5 schematically illustrates a request computer system which communicates with a response computer system via an unsecure zone internal to the response computer system, utilizing the message level encryption disclosed herein.

FIG. 5 schematically illustrates a request computer system 120 which communicates with a response computer system 320 via an unsecure zone 307 internal to the response computer system 320, utilizing the message level encryption disclosed herein. The request computer system 120 in FIG. 5 is the same as the request computer system 100 in FIG. 4, except request computer system 120 in FIG. 5 does not have an unsecure zone. Response computer system 320 in FIG. 5 is the same as the response computer system 300 in FIG. 4, except response computer system 320 has an unsecure zone 307. The message level encryption is generally executed on the request server 102 of the request computer system 120 and the response sever 302 of the response computer system 300 so as to enable transmission of a message-level encrypted request message (e.g., request message 10) over an unsecure zone 307 within the response computer system 320.

In embodiments, the request server 102 may receive the responder public key and generating a requester public key and a requester private key pair (e.g., receipt of a responder public key and generation of a requester public/private key pair may be accomplished via a technique known in the art). In embodiments, the request server 102 may receive instruction or decide (e.g., upon the occurrence of one or more conditions) to generate a request. In embodiments, the request server 102, having previously stored the responder public key and requester private key on the request HSM 101, may retrieve the stored keys from request HSM 101 via communication networking 115 between the request server 102 and the request HSM 101. The request server 102 may generate a request session key 22 and create the request message 10 having the message level encryption (e.g., first level encryption) described in FIG. 1, where the request session key 22 is uniquely created for the request message 10. Moreover, the request session key 22 is a one-time use session key in that the request session key 22 is not used for another request message.

The request server 102 may send the request message 10 to the request security proxy 105 via communication networking 108, neither of which is part of an unsecure zone. To do so, the request server 102 may establish an internal second level encryption for transmission of the request message 10 having the first level encryption (e.g., the message level encryption) internally of the request computer system 120 from the request server 102 to the request security proxy 105. The internal second level encryption may be established using an internal client certificate and/or certified server certificate of the requesting party to provide the internal second level encryption in addition to the first level encryption (e.g., message level encryption as described herein) of the request message 10, e.g., TLS encryption within HTTPS. The response server 102 may send the request message 10 having first level encryption and internal second level encryption to the request security proxy 105 via communication networking 108 (e.g., via TLS encryption within HTTPS).

The internal second level encryption may be different than the first level encryption (e.g., message level encryption described herein) at least because the first level encryption uses the public keys, private keys, and session keys for the first level encryption described herein, while the internal second level encryption uses an internal client certificate and/or certified server certificate for authentication and establishing an internal transmission level encryption (e.g., TLS encryption within HTTPS) for transmitting the request message 10 to the request security proxy 105 via communication networking 108 within the request computer system 120.

In embodiments, the request computer system 120 may have a request security proxy 105 which establishes a second level encryption with the response computer system 320 using a client certificate of the requesting party (issued by the responding party) to authenticate the request computer system 120 to the response computer system 320 for establishing the second level encryption in addition to the first level encryption (e.g., the message level encryption of this disclosure) for transmission of the request message 10, e.g., the second level encryption being TLS encryption within HTTPS. In an embodiment, the request security proxy 105 is an application contained on the request server 102; alternatively, request security proxy 105 is another server in the request computer system 120 connected to the request server 102 via communication networking 108.

As described for FIG. 4, the second level encryption used in FIG. 5 may be different than the first level encryption (e.g., message level encryption described herein) at least because the first level encryption uses the public keys, private keys, and session keys for the message level encryption described herein, while the second level encryption uses the client and server certificates for bi-directional authentication and establishing a transmission level encryption (e.g., TLS encryption within HTTPS) for transmitting the request message 10 to the response computer system 320. Additionally, the second level encryption used for transmitting the request message 10 via communication pathway 200 is different than the internal second level encryption used by the request computer system 120 at least because the internal second level encryption is for communication between components only of the requesting party's request computer system 120; whereas, the second level encryption (transmission level encryption) is for secure communication between the requesting party's request computer system 120 and the responding party's response computer system 320. After establishing the second level encryption for transmission of the request message 10, the request computer system 120 sends the request message 10 to the response computer system 320 via communication pathway 200 (e.g., HTTPS).

After sending the request message 10, the request server 102 may destroy any copy of the request session key 22 on the request server 102; alternatively, the request server 102 may retain the request session key 22 within the request computer system 120.

The response computer system 320 may receive the request message 10 having the first level encryption (message level encryption) and second level encryption (transmission level encryption) via the communication pathway 200. In the embodiment shown in FIG. 5, the response computer system 320 has an unsecure zone 307, unlike the request computer system 120. The unsecure zone 307 of the response computer system 320 of FIG. 5 includes the response security gateway 305, the communication networking 308, or both.

The response security gateway 305 may receive the request message 10 having first level encryption and second level encryption via communication pathway 200. The response security gateway 305 may refer to an application run on a server (e.g., the response server 302 or another server in the response computer system 320), or the response security gateway 305 may itself be one or more servers of the response computer system 320 in addition to the response server 302.

Once the request message 10 is received, the response security gateway 305 may decrypt the second level encryption and may send the request message 10 still having first level encryption (message level encryption) to the response server 302 via communication networking 308. In the response security gateway 305, the request message 10 remains with the message level encryption as described in FIG. 1 such that those with access to the response security gateway 305 cannot view or determine the information contained in the request message 10. That is, the response security gateway 305 of the response computer system 320 does not have both the responder private key and request session key which are needed to decrypt the message level encryption applied to the request message 10 (e.g., the responder private key which is needed to decrypt the encrypted request session key 21 or the request session key 22 needed to decrypt the encrypted request body 31 of the request message 10). Thus, while passing through the response security gateway 305 and communication networking 308, the request message 10 still has the first level encryption which prevents those with access to the unsecure zone 307 (e.g., the response security gateway 305, the communication networking 308, or both) from viewing the information contained within the request message 10.

The response server 302 may then analyze the first level encryption of the request message 10. The response server 302 may determine the request message 10 is a request message which contains a signature 24 (e.g., which was generated using the requester private key). The response server 302 may determine that the signature 24 can be verified by the responding party (e.g., the requester public key having been: i) previously received by the response server 302, ii) stored on the response HSM 301, or iii) both received and stored). The response server 302 may search for and/or retrieve the requester public key and the responder private key from the response HSM 301 via communication networking 315.

In embodiments, the response server 302 may use the signature 24 of the request message 10 to verify the encrypted request session key 21 has not been altered during transmission. In other embodiments, to verify the encrypted request session key 21, the response server 302 may use the requester public key in addition to the signature 24. In embodiments, using the requester public key also verifies that the requesting party is the party who encrypted the request session key 22. In additional or alternative embodiments, using the requester public key also verifies that the request message 10 is actually from the request server 102.

After verification of the encrypted request session key 21, the response server 302 may decrypt the encrypted request session key 21 of the request message 10 using the responder private key which matches and/or pairs with the responder public key which was used to encrypt the request session key 22. After decryption of the encrypted request session key 21, the response server 302 may decrypt the encrypted request body 31 of the request message 10 using the request session key 22.

The response server 302 may then interpret the body 30 of the request message 10 and generate a response. Alternatively, the response server 302 may communicate with another server of the response computer system 300, e.g., communicate the request to another server which generates a response and which sends the response to the response server 302 for message level encryption.

The response server 302 may perform message level encryption for the response so as to generate a response message (e.g., response message 40 of FIG. 2 or response message 70 of FIG. 3) having first level encryption (message level encryption) for transmission of the response message 40 or 70 to the request computer system 100 and for passage of the response message 40 or 70 through the unsecure zone 307 of the response computer system 320.

In an embodiment, the response server 302 may generate a response session key 52 and create the response message 40 with the message level encryption described for FIG. 2, where the response session key 52 is uniquely created for the response message 40. Moreover, the response session key 52 is a one-time use session key in that the response session key 52 is not used for another response message. The response server 302, having previously stored the requester public key and responder private key on the response HSM 301, may retrieve the stored keys from response HSM 301 via communication networking 315 between the response server 302 and the request HSM 301. For response message 40, the response session key 52 may be encrypted using the requester public key to produce the encrypted response session key 51, the responder private key may be used to generate the signature 54 for the encrypted response session key 51, for the response session key 52, or both, and the response body 60 may be encrypted using the response session key 52 to produce encrypted response body 61. The response server 302 may send the response message 40 to the request server 102 via the unsecure zone 307 described above which resides within the response computer system 320, and via communication networking 108, request security proxy 105, communication pathway 200, or combinations thereof of the request computer system 120.

In another embodiment, the response server 302 may use the request session key 22 received from the request server 102 for message level encryption of the response message 70 as described for FIG. 3. The response server 302 may encrypt the response body 90 using the request session key 22 obtained from the request message 10 to produce encrypted response body 91. Because the request server 102 already has the request session key 22, the request session key 22 may not be included in the response message 70. As such, response message 70 may have a different embodiment of first level encryption than the first level encryption described for response message 40 and request message 10. The response server 302 may send the response message 70 to the request server 102 via the unsecure zone 307 described above which resides within the response computer system 320, and via communication networking 108, request security proxy 105, communication pathway 200, or combinations thereof of the request computer system 120.

Those with access to the communication networking 308, the response security gateway 305, or both, cannot view or determine the contents of the response message 40 or 70 because the response server 302, before transmitting the response message 40 or 70 via communication networking 308 and response security proxy 305, configures the response message 40 or 70 with the message level encryption described in FIGS. 2 and 3.

The response message 40 or 70 is transmitted via communication networking 308 to the response security gateway 305 where the response message 40 or 70 is analyzed having the first level encryption. To send the response message 40 or 70, the response security gateway 305 may authenticate the response computer system 320 using the server certificate and may establish the second level encryption for transmission of the response message 40 or 70 from the response computer system 320 to the request computer system 120. The second level encryption for transmission of the response message 40 or 70 from the response computer system 320 to the request computer system 120 may be the same as the second level encryption for transmission of the request message 10 from the request computer system 120 to the response computer system 320, e.g., TLS encryption within HTTPS via communication pathway 200.

After sending the response message 40 or 70, the response server 302 may destroy any copy of the response session key 52 and request session key 22 on the response server 302 or otherwise contained within the response computer system 320.

Once the response message 40 or 70 is received, the request security proxy 105 may decrypt the second level encryption and send the response message 40 or 70 still having first level encryption (message level encryption) to the request server 102 via communication networking 108 via the internal second level encryption described above.

The request server 102 may then analyzes the first level encryption of the response message 40 or 70.

After analysis in embodiments having the response message 40, the request server 102 may determine the response message 40 is a response message which contains signature 54 (e.g., which was generated using the responder private key). The request server 102 may determine the signature 54 can be verified using the responder public key previously received by the requesting party (e.g., the responder public key having been stored on the request HSM 101).

The request server 102 may search for and/or retrieve the responder public key and the requester private key from the request HSM 101 via communication networking 115. The request server 102 may then validate the signature 54 of the response message 40 using the responder public key via one or more public/private key verification techniques known in the art with the aid of this disclosure. For example, to validate the signature 54, the request server 102 may use the responder public key to verify that the signature 54 of the response message 40 was generated by the responding party using the responder private key.

After signature verification of the response message 40, the request server 102 may decrypt the encrypted response session key 51 of the response message 40 using the requester private key which matches and/or pairs with the requester public key which was used to encrypt the response session key 52. After decryption of the encrypted request session key 51, the request server 102 may decrypt the encrypted response body 61 of the response message 40 using the request session key 52. The request server 102 may then interpret the response body 60 of the response message 40.

After analysis in embodiments having the response message 70, because the requesting party already has the request session key 22, the request server 102 may decrypt the encrypted response body 91 of the response message 70 using the request session key 22. Response message 70 has no signature which needs to be verified by the request server 102. The request server 102 may then interpret the response body 90 of the response message 70.

Figure 6:
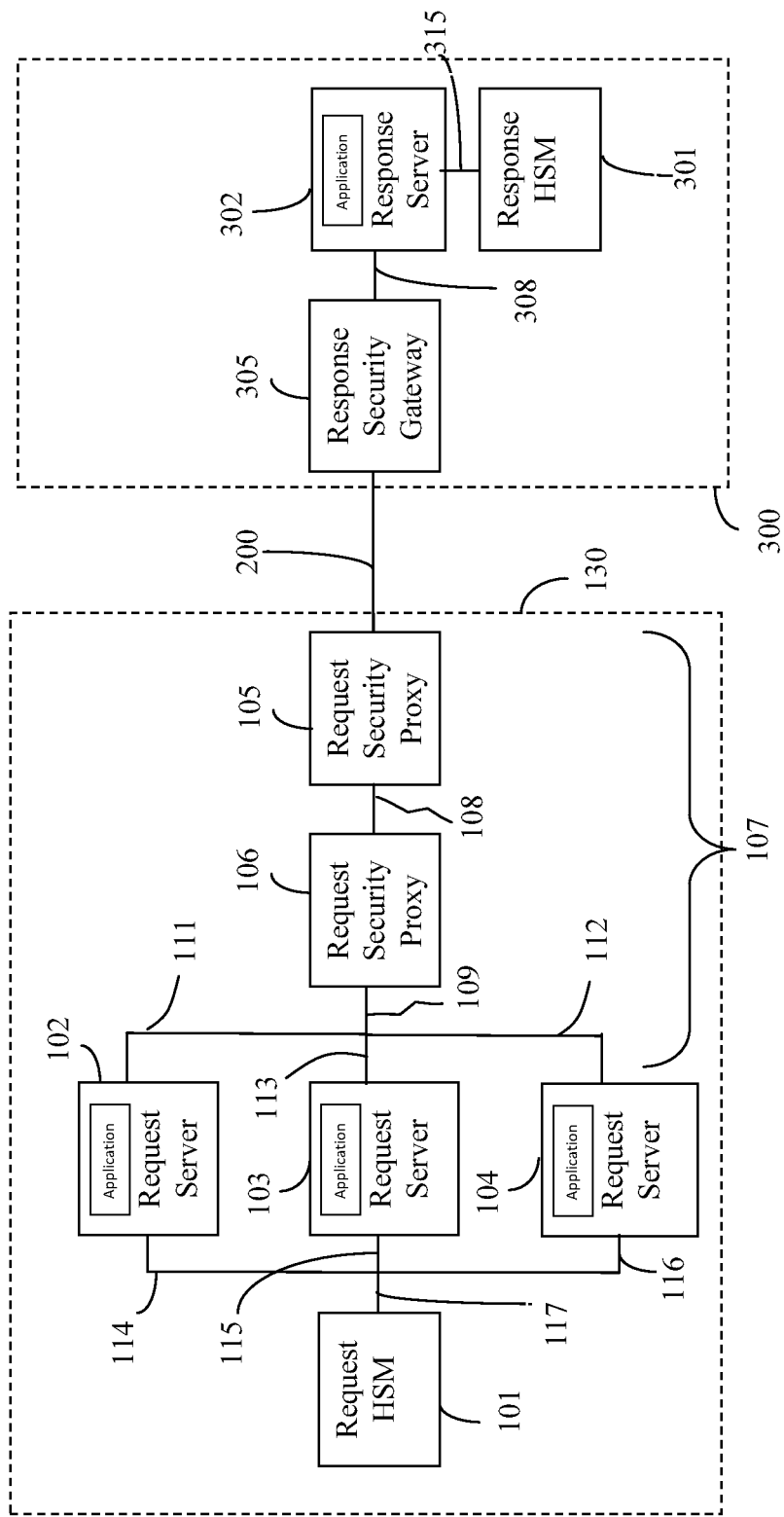
FIG. 6 schematically illustrates a request computer system which communicates with a response computer system via at least one unsecure zone among multiple servers and security proxies of the request computer system, utilizing the message level encryption disclosed herein.

FIG. 6 schematically illustrates a request computer system 130 which communicates with the response computer system 300 of FIG. 4 via at least one unsecure zone 107 among multiple servers and security proxies of the request computer system 130, utilizing the message level encryption disclosed herein. FIG. 6 illustrates that the technique and configurations described for FIG. 4 can be utilized with a request computer system 130 having multiple request servers 102, 103, and 104 and multiple layers of security, e.g., request security proxy 105 and request security proxy 106; although, embodiments of this disclosure include request computer systems which have a single request server and multiple layers of security and request computer system which have multiple request servers and a single layer of security.

Any of the request server 102, request server 103, and request server 104 may perform the message level encryption of a request message 10 and message level decryption of a response message 40 or 70 as described for request server 102 in the request computer system 100 of FIG. 4. Request server 102 communicates with response HSM 101 via communication networking 114 and 117; request server 103 communicates with response HSM 101 via communication networking 115 and 117; and request server 104 communicates with response HSM 101 via communication networking 116 and 117. Request and response messages are sent and received from request server 102 via communication networking 108, 109, and 111 and request security proxies 105 and 106; request and response messages are sent and received from request server 103 via communication networking 108, 109, and 113 and request security proxies 105 and 106; and request and response messages are sent and received from request server 104 via communication networking 108, 109, and 112 and request security proxies 105 and 106.

When sending request message 10 from or receiving a response message 40 or 70 at request server 102, the unsecure zone 107 of the request computer system 130 in FIG. 6 may include one or more of communication networking 108, 109, and 111 along with along with one or more of request security proxies 105 and 106. When sending request message 10 from or receiving a response message 40 or 70 at request server 103, the unsecure zone 107 of the request computer system 130 in FIG. 6 may include one or more of communication networking 108, 109, and 113 along with along with one or more of request security proxies 105 and 106. When sending request message 10 from or receiving a response message 40 or 70 at request server 104, the unsecure zone 107 of the request computer system 130 in FIG. 6 may include one or more of communication networking 108, 109, and 112 along with along with one or more of request security proxies 105 and 106. For example, the requesting party may have granted personnel access to all the communication networking 108, 109, 111, 112, and 113 along with both request security proxies 105 and 106, making all the communication networking 108, 109, 111, 112, and 113 along with both request security proxies 105 and 106, the unsecure zone 107. Alternatively, the requesting party may have granted personnel access to less than all the communication networking 108, 109, 111, 112, and 113 and/or less than both request security proxies 105 and 106, making a combination of the communication networking 108, 109, 111, 112, and 113 and/or request security proxies 105 and 106, the unsecure zone 107.

In request computer system embodiments having multiple layers of security such as request computer system 130 shown in FIG. 6 as having request security proxy 105 and request security proxy 106, the outer layer of security, e.g., request security proxy 105 performs the same functions as described for request security proxy 105 in request computer system 100 of FIG. 4, except that the request security proxy 105 receives the request message 10 from (and sends the response message 40 or 70 to) the request security proxy 106 (an inner layer of security) instead of directly communicating with a request server.

The request security proxy 106 may receive the request message 10 having first level encryption (message level encryption) and analyze the request message 10 as does the request security proxy 105. In the request security proxy 106, the request message 10 maintains the message level encryption such that those with access to the request security proxy 106 cannot view or determine the content of the request message 10 even when the request security proxy 106 analyzes the request message 10. After analyzing the request message 10, the request security proxy 106 passes the request message 10 still having the first level encryption (message level encryption) to the request security proxy 105.

The transmission of the request message from request security proxy 105 to the response computer system 300 is the same as that described in FIG. 4 (e.g., establishment of a second level encryption). The response computer system 300 performs the same message level decryption of the request message 10 and message level encryption of a response message 40 or 70 and sends the response message 40 or 70 to the request computer system 130. Upon receipt of the response message 40 or 70 at the request security proxy 105, the request security proxy 105 analyzes the response message 40 or 70 and, since the request security proxy 105 is the outer layer of security, the request security proxy 105 passes the response message 10 still having the first level encryption (message level encryption) to the request security proxy 106 via communication networking 108 for analysis at the request security proxy 106. The request security proxy 106 may receive the request message 10 having first level encryption (message level encryption) and analyze the request message 10. In the request security proxy 106, the request message 10 maintains the message level encryption such that those with access to the request security proxy 106 cannot view or determine the content of the request message 10 even when the request security proxy 106 analyzes the request message 10. After analyzing the request message 10, the request security proxy 106 passes the request message 10 still having the first level encryption (message level encryption) to the request server (e.g., request server 102, 103, or 104) that originally sent the request message 10. In an alternative embodiment, the request server that sent the request message 10 does not have to be the same request server that receives the response message 40 or 70 corresponding to the request message 10.

Figure 7:
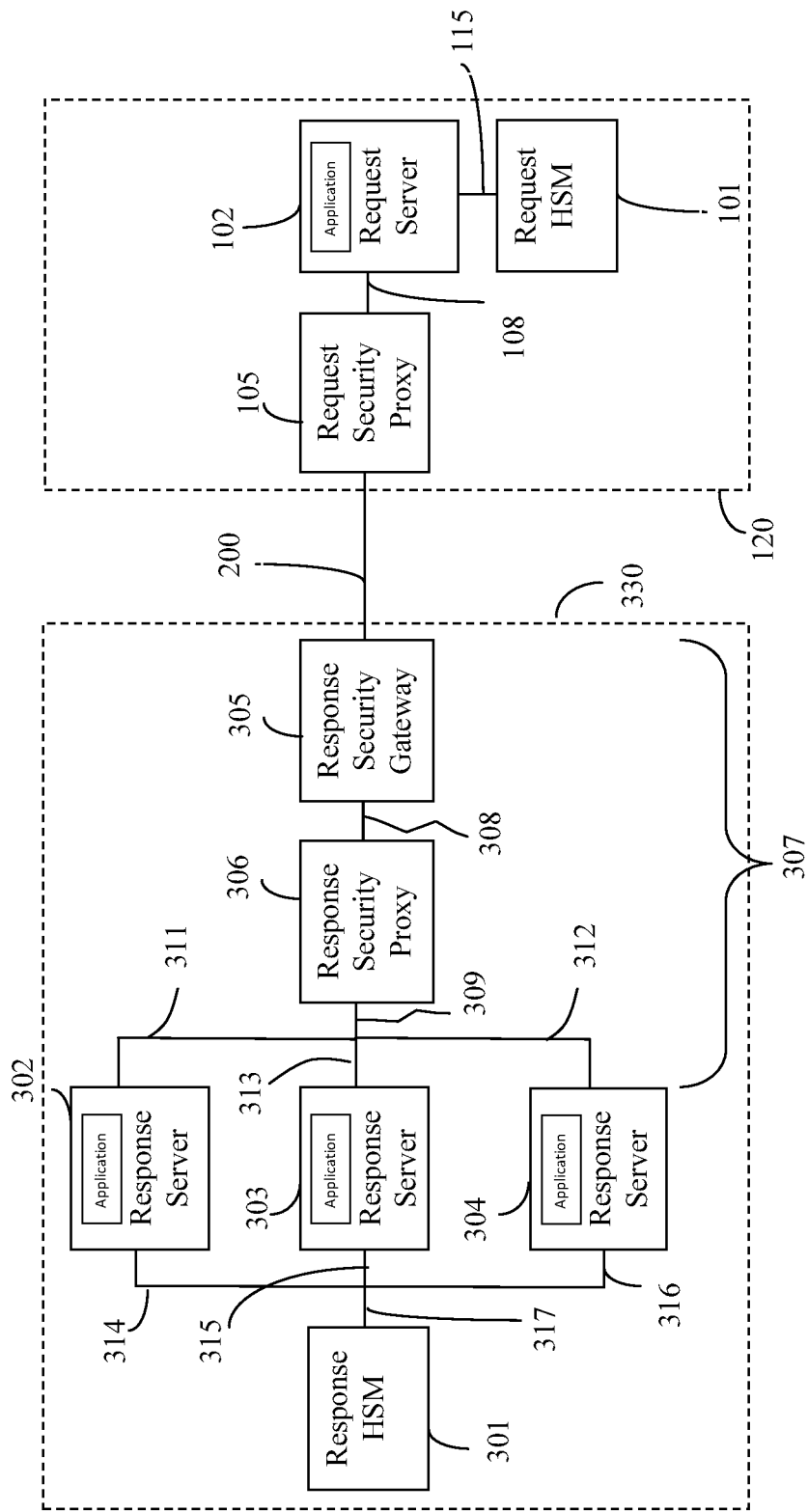
FIG. 7 schematically illustrates a request computer system which communicates with a response computer system via at least one unsecure zone among multiple servers and security proxies of the response computer system, utilizing the message level encryption disclosed herein.

FIG. 7 schematically illustrates a request computer system 120 of FIG. 5 which communicates with the response computer system 330 via at least one unsecure zone 307 among multiple servers and security proxies of the response computer system 330, utilizing the message level encryption disclosed herein. The request computer system 120 may perform the same functions as described in FIG. 5. FIG. 7 illustrates that the technique and configurations described for the response computer system 320 of FIG. 5 can be utilized with a response computer system 330 having multiple response servers 302, 303, and 304 and multiple layers of security, e.g., response security gateway 305 and response security proxy 306; although, embodiments of this disclosure include response computer systems which have a single response server and multiple layers of security and request computer systems which have multiple response servers and a single layer of security.

Any of the response server 302, response server 303, and response server 304 may perform the message level decryption of a request message 10 and message level encryption of a response message 40 or 70 as described for response server 302 in the response computer system 320 of FIG. 5. Response server 302 communicates with response HSM 301 via communication networking 314 and 317; response server 303 communicates with response HSM 301 via communication networking 315 and 317; and response server 304 communicates with response HSM 301 via communication networking 316 and 317. Request and response messages are received and sent from response server 302 via communication networking 308, 309, and 311 and response security gateway 305 and response security proxy 306; request and response messages are received and sent from response server 303 via communication networking 308, 309, and 313 and response security gateway 305 and response security proxy 306; and request and response messages are received and sent from response server 304 via communication networking 308, 309, and 312 and response security gateway 305 and response security proxy 306.

When receiving request message 10 at or sending a response message 40 or 70 from response server 302, the unsecure zone 307 of the response computer system 330 in FIG. 7 may include one or more of communication networking 308, 309, and 311 along with one or more of response security gateway 305 and response security proxy 306. When receiving request message 10 at or sending a response message 40 or 70 from response server 303, the unsecure zone 307 of the response computer system 330 in FIG. 7 may include one or more of communication networking 308, 309, and 313 along with along with one or more of response security gateway 305 and response security proxy 306. When receiving request message 10 at or sending a response message 40 or 70 from response server 304, the unsecure zone 307 of the response computer system 330 in FIG. 7 may include one or more of communication networking 308, 309, and 312 along with along with one or more of response security gateway 305 and response security proxy 306. For example, the responding party may have granted personnel access to all the communication networking 308, 309, 311, 312, and 313 along with both response security gateway 305 and response security proxy 306, making all the communication networking 308, 309, 311, 312, and 313 along with both response security gateway 305 and response security proxy 306, the unsecure zone 307. Alternatively, the responding party may have granted personnel access to less than all the communication networking 308, 309, 311, 312, and 313 and/or less than both response security gateway 305 and response security proxy 306, making a combination of the communication networking 308, 309, 311, 312, and 313 and/or response security gateway 305 and response security proxy 306, the unsecure zone 307.

In response computer system embodiments having multiple layers of security such as response computer system 330 shown in FIG. 7 as having response security gateway 305 and response security proxy 306, the outer layer of security, e.g., response security gateway 305 performs the same functions as described for response security gateway 305 in response computer system 320 of FIG. 5, except that the response security gateway 305 sends the request message 10 to (and receives the response message 40 or 70 from) the response security proxy 306 (an inner layer of security) instead of directly communicating with a response server.

The response security proxy 306 may receive the request message 10 having first level encryption (message level encryption) from the response security gateway 305 and analyze the request message 10. In the response security proxy 306, the request message 10 maintains the message level encryption such that those with access to the response security proxy 306 cannot view or determine the content of the request message 10 even when the response security proxy 306 analyzes the request message 10 (e.g., checks the message for a blacklisted IP address, a virus signature, a frequency of the request, or other message auditing). After analyzing the request message 10, the response security proxy 306 passes the request message 10 still having the first level encryption (message level encryption) to a response server 302, 303, or 304.

The response server 302, 303, or 303 of the response computer system 330 performs the same message level decryption of the request message 10 and message level encryption of a response message 40 or 70 as described for response server 302 in response computer system 320 in FIG. 5 and sends the response message 40 or 70 to the request computer system 120 via the response security gateway 305 and response security proxy 306 and the appropriate combination of communication networking (e.g., communication networking 308, 309, and 311 for response server 302; communication networking 308, 309, and 313 for response server 303; and communication networking 308, 309, and 312 for response server 304).

Upon receipt of the response message 40 or 70 at the response security proxy 306, the response security proxy 306 analyzes the response message 40 or 70. In the response security proxy 306, the response message 40 or 70 maintains the message level encryption such that those with access to the response security proxy 306 cannot view or determine the content of the response message 40 or 70 even when the response security proxy 306 analyzes the response message 40 or 70. After analyzing the response message 40 or 70, the response security proxy 306 passes the response message 40 or 70 still having the first level encryption (message level encryption) to the response security gateway 305.

In the response security gateway 305, the response message 40 or 70 maintains the message level encryption such that those with access to the response security gateway 305 cannot view or determine the content of the response message 40 or 70 even when the response security gateway 305 analyzes the response message 40 or 70. After analyzing the response message 40 or 70, the response security gateway 305 establishes the second level of encryption for transmission of the response message 40 or 70 to the request computer system 120 in the same manner as described for FIG. 5. The request computer system 120 receives and decrypts the message level encryption of the response message 40 or 70 in the same manner as described for FIG. 5.

Figure 8:
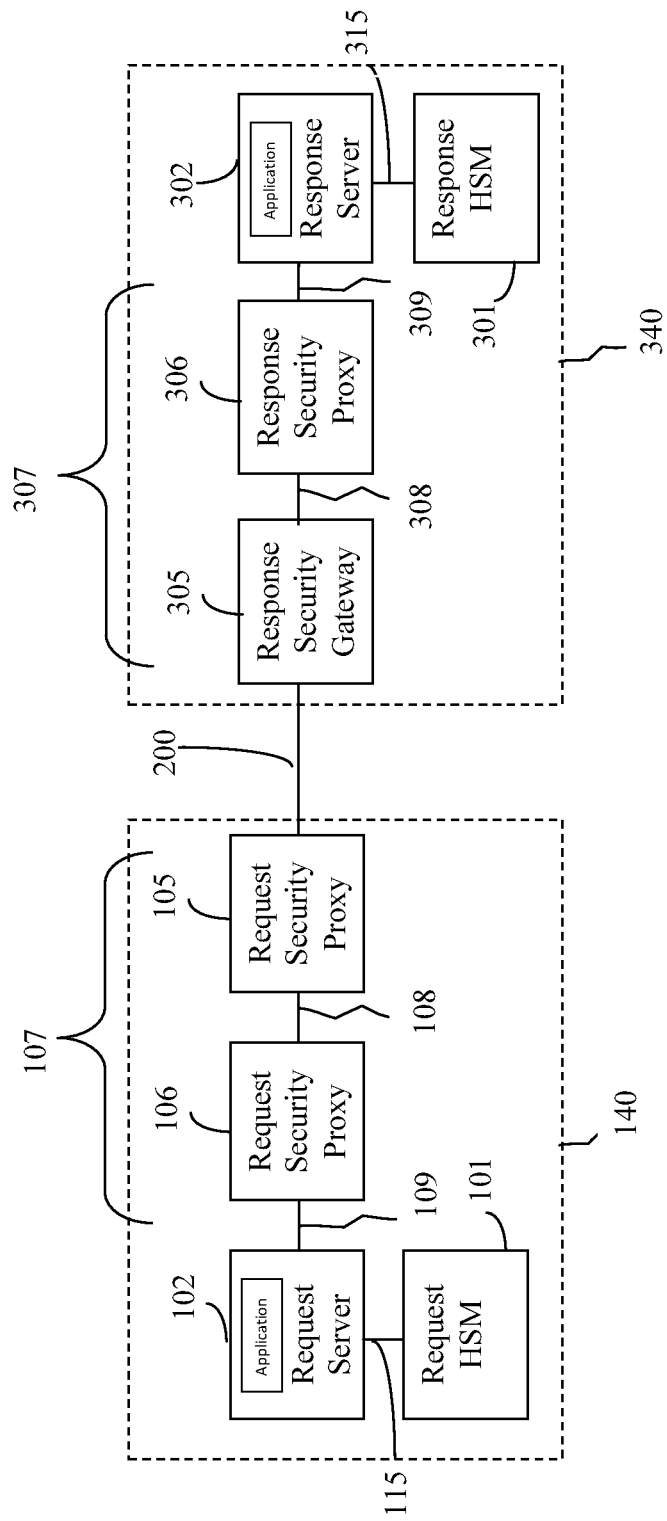
FIG. 8 schematically illustrates a request computer system which communicates with a response computer system via at least one unsecure zone among multiple servers and security proxies of the request computer system and via at least one unsecure zone among multiple servers and security proxies of the response computer system, utilizing the message level encryption disclosed herein.

FIG. 8 schematically illustrates a request computer system 140 which communicates with a response computer system 340 via at least one unsecure zone 107 among multiple servers and security proxies of the request computer system 140 and via at least one unsecure zone 307 among multiple servers and security proxies of the response computer system 340, utilizing the message level encryption disclosed herein.

FIG. 8 illustrates that the technique and configurations described for FIGS. 4 and 6 can be utilized with a request computer system 140 having a single request server 102

(although multiple request servers as illustrated in FIG. 6 are contemplated) and multiple layers of security, e.g., request security proxy 105 and request security proxy 106; although embodiments of this disclosure include request computer systems which have a single request server and multiple layers of security, request computer systems which have multiple request servers and a single layer of security, request computer systems which have a single request server and a single layer of security, and request computer systems which have multiple request servers and multiple layers of security.

The request server 102 may perform the message level encryption of a request message 10 and message level decryption of a response message 40 or 70 as described for request server 102 in the request computer system 100 of FIG. 4. Request and response messages are sent and received from request server 102 via communication networking 108 and 109.

When sending request message 10 from or receiving a response message 40 or 70 at request server 102, the unsecure zone 107 of the request computer system 140 in FIG. 8 may include one or more of communication networking 108 and 109 along with along with one or more of request security proxies 105 and 106. The requesting party may have granted personnel access to all the communication networking 108 and 109 along with both request security proxies 105 and 106, making all the communication networking 108 and 109 along with both request security proxies 105 and 106, the unsecure zone 107. Alternatively, the requesting party may have granted personnel access to less than all the communication networking 108 and 109 and/or less than both request security proxies 105 and 106, making a combination of the communication networking 108 and/or 109 and/or request security proxies 105 and/or 106, the unsecure zone 107.

In request computer system embodiments having multiple layers of security such as request computer system 140 shown in FIG. 7 as having request security proxy 105 and request security proxy 106, the outer layer of security, e.g., request security proxy 105 performs the same functions as described for request security proxy 105 in request computer system 100 of FIG. 4, except that the request security proxy 105 receives the request message 10 from (and sends the response message 40 or 70 to) the request security proxy 106 (an inner layer of security) instead of directly communicating with a request server, in the same manner as is described for request security proxy 105 in FIG. 6.

The transmission of the request message 10 from request security proxy 105 to the response computer system 340 is the same as that described in FIG. 4 (e.g., establishment of a second level encryption).

FIG. 8 also illustrates that the technique and configurations described for the response computer system 320 of FIG. 5 can be utilized with a response computer system 340 having a single server 302 and multiple layers of security, e.g., response security gateway 305 and response security proxy 306; although embodiments of this disclosure include response computer systems which have a single response server and multiple layers of security, response computer systems which have multiple response servers and a single layer of security, response computer systems which have a single response server and a single layer of security, and response computer systems which have multiple response servers and multiple layers of security.

The response server 302 may perform the message level decryption of a request message 10 and message level encryption of a response message 40 or 70 as described for response server 302 in the response computer system 320 of FIG. 5. Request and response messages are received and sent from response server 302 via communication networking 308 and 309, response security proxy 306, and response security gateway 305.

When receiving request message 10 at or sending a response message 40 or 70 from response server 302, the unsecure zone 307 of the response computer system 340 in FIG. 8 may include one or more of communication networking 308 and 309 along with one or more of response security gateway 305 and response security proxy 306. The responding party may have granted personnel access to all the communication networking 308 and 309 along with both response security gateway 305 and response security proxy 306, making all the communication networking 308 and 309 along with both response security gateway 305 and response security proxy 306, the unsecure zone 307. Alternatively, the responding party may have granted personnel access to less than all the communication networking 308 and 309 and/or less than both response security gateway 305 and response security proxy 306, making a combination of the communication networking 308 and/or 309 and/or response security gateway 305 and/or response security proxy 306, the unsecure zone 307.

In response computer system embodiments having multiple layers of security such as response computer system 340 shown in FIG. 8 as having response security gateway 305 and response security proxy 306, the outer layer of security, e.g., response security gateway 305 performs the same functions as described for response security gateway 305 in response computer system 320 of FIG. 5, except that the response security gateway 305 sends the request message 10 to (and receives the response message 40 or 70 from) the response security proxy 306 (an inner layer of security) instead of directly communicating with a response server, in the same manner as described for response security gateway 305 in FIG. 7.

The response security proxy 306 may receive the request message 10 having first level encryption (message level encryption) from the response security gateway 305 and analyze the request message 10. In the response security proxy 306, the request message 10 maintains the message level encryption such that those with access to the response security proxy 306 cannot view or determine the content of the request message 10 even when the response security proxy 306 analyzes the request message 10. After analyzing the request message 10, the response security proxy 306 passes the request message 10 still having the first level encryption (message level encryption) to response server 302.

The response server 302 of the response computer system 340 performs the same message level decryption of the request message 10 and message level encryption of a response message 40 or 70 as described for response server 302 in response computer system 320 in FIG. 5 and sends the response message 40 or 70 to the request computer system 120 via the response security gateway 305 and response security proxy 306 and communication networking 308 and 309.

Upon receipt of the response message 40 or 70 at the response security proxy 306, the response security proxy 306 analyzes the response message 40 or 70. In the response security proxy 306, the response message 40 or 70 maintains the message level encryption such that those with access to the response security proxy 306 cannot view or determine the content of the response message 40 or 70 even when the response security proxy 306 analyzes the response message 40 or 70. After analyzing the response message 40 or 70, the response security proxy 306 passes the response message 40 or 70 still having the first level encryption (message level encryption) to the response security gateway 305.

In the response security gateway 305, the response message 40 or 70 maintains the message level encryption such that those with access to the response security gateway 305 cannot view or determine the content of the response message 40 or 70 even when the response security gateway 305 analyzes the response message 40 or 70. After analyzing the response message 40 or 70, the response security gateway 305 establishes the second level of encryption for transmission of the response message 40 or 70 to the request computer system 140 in the same manner as described for FIG. 5.

Upon receipt of the response message 40 or 70 at the request security proxy 105, the request security proxy 105 decrypts the second level encryption and analyzes the response message 40 or 70 still having the first level encryption and, since the request security proxy 105 is the outer layer of security, the request security proxy 105 passes the response message 40 or 70 still having the first level encryption (message level encryption) to the request security proxy 106 via communication networking 108 for analysis at the request security proxy 106. The request security proxy 106 may receive the response message 40 or 70 having first level encryption (message level encryption) and analyze the response message 40 or 70. In the request security proxy 106, the response message 40 or 70 maintains the message level encryption such that those with access to the request security proxy 106 cannot view or determine the content of the response message 40 or 70 even when the request security proxy 106 analyzes the response message 40 or 70. After analyzing the response message 40 or 70, the request security proxy 106 passes the response message 40 or 70 still having the first level encryption (message level encryption) to the request server 102, 103, or 104.

Nonlimiting examples of a requesting party and responding party discussed herein include financial institutions and application service providers. Financial institutions may include but are not limited to banks, building societies, credit unions, trust companies, mortgage loan companies, insurance companies, pension funds, investment firms, underwriters, and brokerage firms. Application service providers include but are not limited to payment processing providers and payment network providers. Examples of a "responding party" include application service providers.

In embodiments, the requester public key and requester private key pair are rotated once per year. In embodiments, the responder public key and response private key are rotated one per year.

Code Example 1

The following Code Example 1 shows the Java interface definition that can be used to retrieve public and private keys from an enterprise key manager, e.g., an HSM.

| Key Management Interface |
| --- |
| public interface KeyManagement {<br>    // retrieve the requestor's public key by name<br>    public PublicKey retrieveSendersPublicKey(String keyName);<br>    // retrieve the requestor's private key by name<br>    public PrivateKey retrieveSendersPrivateKey(String keyName);<br>    // retrieve the responder's public key by name<br>    public PublicKey retrieveReceiversPublicKey(String keyName);<br>    // retrieve the responder's private key by name<br>    public PrivateKey retrieveReceiversPrivateKey(String keyName);<br>} |

Retrieval of keys as disclosed herein may use a key name as a parameter. The key name can be any unique string that identifies the exchanged keys for the retrieval. For example, the key name for the sender and receiver key pairs for a particular bank might be "N3WLHB2BG63V2MA6GRB1LML0L0".

Code Example 2

The following code block shows the Java interface definition that can be used to encrypt the request and response messages disclosed herein. This Code Example 2 may be used by the request server(s) to encrypt each request message and by the response server(s) to encrypt each response message. This Code Example 2 may also be used by the request server(s) (and optionally, the response server(s)) to generate, encrypt, and sign the request session key (and optionally, the response session key) that is used by both the responding party and the requesting party.

| Message Encryption Interface |
| --- |
| public interface MessageEncryption {<br>    // encode the bytes into a base 64 string<br>    public String encodeBytes(byte[ ] bytes);<br>    // sign the bytes using the private key<br>    public byte[ ] signBytes(PrivateKey privateKey, byte[ ] bytes);<br>    // generate a new session key<br>    public SecretKey generateSharedKey( );<br>    // encrypt the session key using the public key<br>    public byte[ ] encryptSharedKey(PublicKey certificate, SecretKey sharedKey);<br>    // encrypt the stream using the session key<br>    public void encryptStream(SecretKey sharedKey, InputStream input, OutputStream output);<br>} |

Code Example 3

The following code block shows a similar Java interface definition that can be used to decrypt response and request messages. This Code Example 3 may be used by the response server(s) to decrypt a request message and by the request server(s) to decrypt the response message. This Code Example 3 may also be used to verify and decrypt a request session key and response session key.

| Message Decryption Interface |
| --- |
| public interface MessageDecryption {<br>    // decode the base 64 string into bytes<br>    public byte[ ] decodeString(String base64String);<br>    // validate the signature for bytes using the public key<br>    public boolean bytesAreValid(PublicKey certificate, byte[ ] bytes, byte[ ] signature);<br>    // decrypt the session key using the private key<br>    public SecretKey decryptSharedKey(PrivateKey privateKey, byte[ ] encryptedKey);<br>    // decrypt the stream using the session key<br>    public void decryptStream(SecretKey sharedKey, InputStream input, OutputStream output);<br>} |

Code Example 4

Code Example 4 is for requester server(s) that perform encryption.

| Encryption Code Example |
| --- |
| KeyManagement keyManager;<br>MessageEncryption cryptex;<br>// generate and encrypt a new session key<br>SecretKey sessionKey = cryptex.generateSharedKey( );<br>PublicKey receiverPublicKey =<br>keyManager.retrieveReceiversPublicKey("KeyName");<br>byte[ ] encryptedSessionKey =<br>    cryptex.encryptSharedKey(receiverPublicKey, sessionKey);<br>String encodedSessionKey = cryptex.encodeBytes(encryptedSessionKey);<br>// sign the encrypted session key<br>PrivateKey senderPrivateKey =<br>keyManager.retrieveSendersPrivateKey("KeyName ");<br>byte[ ] signature = cryptex.signBytes(senderPrivateKey,<br>encryptedSessionKey);<br>String encodedSignature = cryptex.encodeBytes(signature);<br>// encrypt the JSON request using the session key<br>String request = "This is some JSON request...";<br>InputStream requestStream = new<br>ByteArrayInputStream(request.getBytes("UTF-8"));<br>ByteArrayOutputStream encryptedRequestStream = new<br>ByteArrayOutputStream( );<br>cryptex.encryptStream(sessionKey, requestStream,<br>encryptedRequestStream); |

Code Example 5

Code Example 5 is for responder server(s) that perform decryption.

| Decryption Code Example |
| --- |
| KeyManagement keyManager;<br>MessageDecryption cryptex;<br>// validate the session key signature<br>PublicKey senderPublicKey =<br>keyManager.retrieveSendersPublicKey("KeyName");<br>byte[ ] signature = cryptex.decodeString(encodedSignature);<br>assert cryptex.bytesAreValid(senderPublicKey, encryptedSessionKey,<br>signature);<br>// decrypt the session key<br>PrivateKey receiverPrivateKey =<br>keyManager.retrieveReceiversPrivateKey("KeyName");<br>byte[ ] encryptedSessionKey =<br>cryptex.decodeString(encodedSessionKey);<br>sessionKey = cryptex.decryptSharedKey(receiverPrivateKey,<br>encryptedSessionKey);<br>// decrypt the request using the session key<br>ByteArrayOutputStream decryptedRequestStream = new<br>ByteArrayOutputStream( );<br>cryptex.decryptStream(sessionKey, encryptedRequestStream,<br>decryptedRequestStream); |

The methods, computer systems, computer networks, apparatus, servers, processors, dedicated processors, and other computer components disclosed herein provide a solution necessarily rooted in computer technology to overcome a problem specifically arising in the realm of computer networks, e.g., problems related to the unsecure transmission of messages between a requesting party's computer system and a responding party's computer system. The disclosed solutions, which involve message level encryption of messages transmitted via the embodiments disclosed herein, enable said embodiments to overcome problems such as unintended viewing of messages (i.e., the unintended viewing of messages by those with authorized access to a computer system or a component thereof), unauthorized viewing of messages, misappropriation or theft of information contained in the messages, collateral damage resulting from misappropriation or theft of information, and identity theft or fraud resulting from misappropriation or theft. These solutions do not simply utilize the Internet and/or other information networks. Instead, the disclosed solutions solve problems arising due to the structural nature of computer networks utilized by requesting parties and responding parties for the transmission of messages. By utilizing the message level encryption, the disclosed methods, computer systems, computer networks, apparatus, servers, processors, dedicated processors, and other computer hardware utilize a specific technique necessarily rooted in computer technology for transmitting messages through one or more unsecure zones in one or more computer systems.

While preferred embodiments of the invention have been shown and described herein, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The ordering of steps to perform the various functions described herein is for illustration purposes and does not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, applications, instructions, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

It is claimed:

1. A method for message level encryption executed by one or more dedicated processors of a computer system of a requesting party for encrypted transmission of messages through an unsecure zone within the computer system of the requesting party, through an unsecure zone within a computer system of a responding party, or through both, the method comprising:
encrypting, by the one or more dedicated processors, a request message with a request message-level encryption;
encrypting, by the one or more dedicated processors, the request message with a request second level encryption; and
sending, by the one or more dedicated processors, the request message to a responding party via the unsecure zone within the computer system of the requesting party, via the unsecure zone within the computer system of the responding party, or via both.

2. The method of claim 1, further comprising:
generating, by the one or more dedicated processors, a request session key uniquely created for the request message; and
encrypting, by the one or more dedicated processors, the request session key to produce an encrypted request session key;
for the request message level encryption, the request message comprising a request header and a request body, the request header comprising the encrypted request session key and a request signature for the encrypted request session key, a requester private key being used to generate the request signature, the request session key being encrypted using a responder public key, and the request body being encrypted using the request session key.

3. The method of claim 2, the request second level encryption being TLS encryption within HTTPS.

4. The method of claim 1, further comprising:
receiving, by the one or more dedicated processors, a response message having a response message level encryption and a response second level encryption from the responding party via passage of the response message through the unsecure zone within the computer system of the requesting party, via passage of the response message through the unsecure zone within the computer system of the responding party, or via both.

5. The method of claim 4, for the response message level encryption, the response message comprising a response header and a response body, the response header comprising an encrypted response session key and a response signature for the encrypted response session key, a responder private key being used to generate the response signature, the response body being encrypted using a response session key, and the response session key being encrypted using a requester public key.

6. The method of claim 5, further comprising:
decrypting, by the one or more dedicated processors, the response second level encryption; and
decrypting, by the one or more dedicated processors, the response message level encryption using the requester private key, the response session key, or both.

7. The method of claim 4, for the response message level encryption, the response message comprising a response body, the response body being encrypted using the request session key.

8. The method of claim 7, further comprising;
decrypting, by the one or more dedicated processors, the response second level encryption; and
decrypting, by the one or more dedicated processors, the response message level encryption using the request session key.

9. The method of claim 1, wherein the unsecure zone of the computer system of the requesting party comprises a request security proxy, a request communication networking, or both; wherein the unsecure zone of the computer system of the responding party comprises a response security gateway, a response communication networking, or both; or both.

10. The method of claim 1, further comprising:
not storing, by the one or more dedicated processors, the request session key on the computer system of the requesting party.

11. The method of claim 1, the request session key being destroyed by the requesting party and the responding party.

12. The method of claim 1, further comprising:
storing, by the one or more dedicated processors, a requester public key, a requester private key, and a responder public key in an HSM system of the requesting party.

13. A method for message level encryption executed by one or more dedicated processors of a computer system of a responding party for encrypted transmission of messages through an unsecure zone within the computer system of the responding party, through an unsecure zone within a computer system of a requesting party, or through both, the method comprising:
encrypting, by the one or more dedicated processors, the response message with a response message-level encryption;
encrypting, by the one or more dedicated processors, the response message with a response second level encryption; and
sending, by the one or more dedicated processors, the response message to the requesting party via the unsecure zone within the computer system of the requesting party, via the unsecure zone within the computer system of the responding party, or via both.

14. The method of claim 13, the method further comprising:
receiving, by the one or more dedicated processors, a request session key from the requesting party;
for the response message level encryption, the response message comprising a response body, the response body being encrypted using the request session key.

15. The method of claim 14, the response second level encryption being TLS encryption within HTTPS.

16. The method of claim 13, further comprising:
generating, by the one or more dedicated processors, a response session key uniquely created for the response message; and
encrypting, by the one or more dedicated processors, the response session key to produce an encrypted response session key;
for the response message level encryption, the response message comprising a response header and a response body, the response header comprising the encrypted response session key and a response signature for the encrypted response session key, a responder private key being used to generate the response signature, the response session key being encrypted using a requester public key, and the response body being encrypted using the response session key.

17. The method of claim 16, the response second level encryption being TLS encryption within HTTPS.

18. The method of claim 13, further comprising:
receiving, by the one or more dedicated processors, a request message having a request message level encryption and a request second level encryption from the requesting party via passage of the request message through the unsecure zone within the computer system of the requesting party, via passage of the response message through the unsecure zone within the computer system of the responding party, or via both.

19. The method of claim 18, for the request message level encryption, the request message comprising a request header and a request body, the request header comprising an encrypted request session key and a request signature for the encrypted request session key, a requester private key being used to generate the request signature, a request session key being encrypted using a responder public key to produce the encrypted request session key, and the request body being encrypted using the request session key.

20. The method of claim 19, further comprising:
decrypting, by the one or more dedicated processors, the request second level encryption; and
decrypting, by the one or more dedicated processors, the request message level encryption using the responder private key, the request session key, or both.

21. The method of claim 13, wherein the unsecure zone of the computer system of the requesting party comprises a request security proxy, a communication networking, or both;
wherein the unsecure zone of the computer system of the responding party comprises a request security gateway, a communication networking, or both; or both.

22. The method of claim 13, further comprising:
storing, by the one or more dedicated processors, a responder public key, a responder private key, and a requester public key in an HSM system of the responding party.

* * * * *